(12) United States Patent
Yoon et al.

(10) Patent No.: US 10,681,743 B2
(45) Date of Patent: Jun. 9, 2020

(54) METHOD AND APPARATUS FOR FACILITATING COEXISTENCE OF 4th AND 5th GENERATION COMMUNICATION SYSTEMS

(71) Applicant: Samsung Electronics Co., Ltd, Suwon-si (KR)

(72) Inventors: Suha Yoon, Yongin-si (KR); Euichang Jung, Seoul (KR); Suyoung Park, Uiwang-si (KR); Sunghyuk Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/003,393

(22) Filed: Jun. 8, 2018

(65) Prior Publication Data
US 2018/0359781 A1 Dec. 13, 2018

(30) Foreign Application Priority Data

Jun. 9, 2017 (KR) .................. 10-2017-0072404
Nov. 17, 2017 (KR) .................. 10-2017-0153740

(51) Int. Cl.
*H04W 74/08* (2009.01)
*H04W 72/04* (2009.01)
(Continued)

(52) U.S. Cl.
CPC ......... *H04W 74/085* (2013.01); *H04W 16/14* (2013.01); *H04W 72/0406* (2013.01);
(Continued)

(58) Field of Classification Search
CPC .............. H04W 74/085; H04W 16/14; H04W 72/0406; H04W 80/00; H04W 74/002; H04W 4/70; H04W 72/0446; H04L 69/18
See application file for complete search history.

(56) References Cited

U.S. PATENT DOCUMENTS

| 2011/0294529 A1* | 12/2011 | Luo ................. | H04L 5/0035 455/509 |
| 2012/0063426 A1* | 3/2012 | Noh ................. | H04L 5/0048 370/336 |

(Continued)

OTHER PUBLICATIONS

LG Electronics, "Discussion on FDD support in NR", 3GPP TSG RAN WG1 Meeting #90bis, Oct. 9-13, 2017, 8 pages, R1-1717982.

*Primary Examiner* — Christopher P Grey

(57) ABSTRACT

The present disclosure relates to a communication scheme and system for converging a 5th generation (5G) communication system for supporting a data rate higher than that of a 4th generation (4G) system with an internet of things (IoT) technology. The present disclosure is applicable to intelligent services (e.g., smart homes, smart buildings, smart cities, smart cars, connected cars, health care, digital education, retails, and security and safety-related services) based on the 5G communication technology and IoT-related technology. A method for transmitting and receiving a signal in a wireless communication system includes determining a resource of a second communication system which is prone to a collision with a sounding reference signal (SRS) of a first communication system, transmitting reserved resource information indicating the collision-prone resource to a terminal, and receiving a signal transmitted by the terminal based on the reserved resource information, wherein no signal being transmitted on the collision-prone resource.

26 Claims, 22 Drawing Sheets

(51) Int. Cl.
  *H04W 16/14* (2009.01)
  *H04W 74/00* (2009.01)
  *H04L 29/06* (2006.01)
  *H04W 80/00* (2009.01)
  *H04W 4/70* (2018.01)

(52) U.S. Cl.
  CPC .............. *H04L 69/18* (2013.01); *H04W 4/70* (2018.02); *H04W 72/0446* (2013.01); *H04W 74/002* (2013.01); *H04W 80/00* (2013.01)

(56) References Cited

U.S. PATENT DOCUMENTS

| | | | |
|---|---|---|---|
| 2013/0028138 A1* | 1/2013 | Hao | H04L 5/0051 370/254 |
| 2014/0086116 A1* | 3/2014 | Seo | H04W 72/14 370/280 |
| 2015/0195063 A1* | 7/2015 | Ro | H04L 5/0042 370/329 |
| 2015/0326377 A1* | 11/2015 | Freda | H04W 72/005 370/278 |
| 2016/0309494 A1 | 10/2016 | Kadous et al. | |
| 2017/0048791 A1 | 2/2017 | Choi | |
| 2017/0063514 A1* | 3/2017 | Chen | H04L 5/14 |
| 2017/0332357 A1* | 11/2017 | Xu | H04W 4/70 |
| 2018/0132237 A1* | 5/2018 | Sundararajan | H04W 72/0446 |
| 2018/0206229 A1* | 7/2018 | Zeng | H04W 72/0486 |
| 2018/0295523 A1* | 10/2018 | Mallik | H04W 16/14 |
| 2019/0058516 A1* | 2/2019 | Yang | H04W 72/04 |

\* cited by examiner

300

310

METHOD AND APPARATUS FOR FACILITATING COEXISTENCE OF 4$^{th}$ AND 5$^{th}$ GENERATION COMMUNICATION SYSTEMS

CROSS-REFERENCE TO RELATED APPLICATIONS AND CLAIM OF PRIORITY

This application is based on and claims priority under 35 U.S.C. § 119 to Korean Patent Application No. 10-2017-0072404 filed on Jun. 9, 2017 and Korean Patent Application No. 10-2017-0153740 filed on Nov. 17, 2017 in the Korean Intellectual Property Office, the disclosures of which are incorporated herein by reference in their entireties.

BACKGROUND

1. Field

The present disclosure relates to 5$^{th}$ generation (5G) wireless communication. In particular, the present disclosure relates to a method for facilitating coexistence of a 5G communication system with a 4$^{th}$ generation (4G) communication system.

2. Description of Related Art

In order to meet the increasing demand for wireless data traffic since the commercialization of 4$^{th}$ generation (4G) communication systems, the development focus is on the 5$^{th}$ generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) {FOAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

A 5G communication system may be deployed to operate in the same frequency band as a 4G communication and, in this case, it may be necessary for the 5G communication system to keep certain resources vacant for sounding reference signal (SRS) transmission in the 4G communication system. In the case where the 5G communication system operates using part of the time resource of the 4G communication system, a transmission latency and resource utilization inefficiency can occur according to timing relation between 5G downlink and 5G uplink subframes timings.

SUMMARY

The present disclosure provides a method and apparatus for configuring 5G downlink and uplink subframe timings, in an environment where a 5G communication system coexists with the 4G communication system, so as to guarantee SRS transmission in the 4G communication system and manage resources efficiently.

In accordance with an aspect of the present disclosure, a method for transmitting and receiving a signal in a wireless communication system is provided. The method includes determining a resource of a second communication system that is overlapped with a sounding reference signal (SRS) of a first communication system, transmitting reserved resource information indicating the overlapped resource to a terminal, and receiving a signal transmitted by the terminal based on the reserved resource information, wherein no signal is transmitted on the collision-prone resource.

In accordance with another aspect of the present disclosure, a method for transmitting and receiving a signal in a wireless communication system is provided. The method includes receiving reserved resource information from a base station, the reserved resource information indicating overlapped resource of a second communication system with a sounding reference signal (SRS) of a first communication system and transmitting a signal to the base station based on the reserved resource information, wherein no signal is transmitted on the collision-prone resource.

In accordance with another aspect of the present disclosure, a base station for transmitting and receiving a signal in a wireless communication system is provided. The base station includes a transceiver configured to transmits and receives the signal and a controller configured to determine a resource of a second communication system that is overlapped with a sounding reference signal (SRS) of a first communication system and control the transceiver to transmit reserved resource information indicating the overlapped resource to a terminal and receive a signal transmitted by the terminal based on the reserved resource information, wherein no signal being transmitted on the collision-prone resource.

In accordance with still another aspect of the present disclosure, a terminal for transmitting and receiving a signal in a wireless communication system is provided. The terminal includes a transceiver configured to transmit and receive the signal and a controller configured to control the transceiver to receive reserved resource information from a base station, the reserved resource information indicating a collision-prone resource, and transmit a signal to the base station based on the reserved resource information, wherein the collision-prone resource is a resource of a second communication system on which the signal collides with a sounding reference signal (SRS) of a first communication system, and no signal being transmitted on the collision-prone resource.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
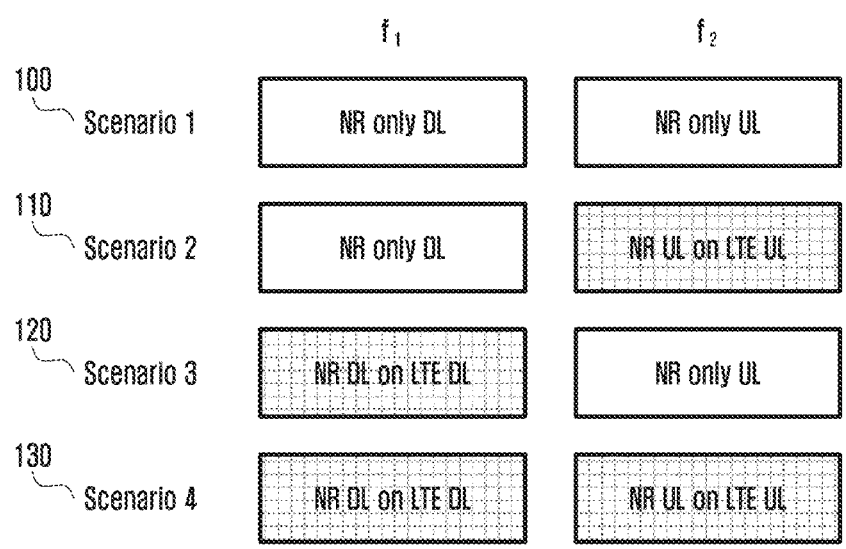
FIG. 1 is a diagram illustrating scenarios of providing services sorted according to bands in which a 5G communication system operates.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure are described with reference to the accompanying drawings in detail. Detailed description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the description is directed to specific communication systems, it will be understood by those skilled in the art that the present disclosure can be applied even to other communication systems having the similar technical background and channel format, with a slight modification, without departing from the spirit and scope of the present disclosure.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, the operations of two successive blocks may be performed substantially at the same time or in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The 5G wireless communication system as the successor of the 4G wireless communication system is characterized by diverse services grouped under three generic service types, i.e., enhanced mobile broadband (eMBB), ultra-reliable and low-latency communications (URLLC), and massive machine type communications (mMTC). Also, discussions are underway to provide the services in two frequency spectrums (e.g., above 6 (spectrum above 6 GHz) and below 6 (spectrum below 6 Ghz)) in the 5G wireless communication system. Particularly, some discussions are focused on how to facilitate coexistence of the 5G communication system with the legacy LTE communication system in the scenario of using the spectrum below 6 Ghz for the 5G communication system to provide the services in the frequency bands in use by a legacy LTE communication system.

FIG. 1 is a diagram illustrating scenarios of providing services sorted according to bands in which a 5G communication system operates. Discussions are ongoing about 5G wireless communication in both frequency division duplexing (FDD) and time division duplexing (TDD) modes. In the FDD mode, the downlink and uplink carriers are on different frequency bands.

In reference to FIG. 1, scenario 1 100 is directed to the case where 5G downlink and uplink carriers are located in frequency bands separated from legacy LTE frequency bands, and scenario 2 110 is directed to the case where the 5G downlink carrier is located in a frequency band separated from the legacy LTE frequency band while the 5G uplink carrier is located in a frequency band overlapped with a legacy LTE frequency band. Scenario 3 120 is directed to the case where the 5G downlink carrier is located in a frequency band overlapped with a legacy LTE frequency band while the 5G uplink carrier is located in a frequency band separated from legacy LTE frequency bands; scenario 4 130 is directed to the case where 5G downlink and uplink carriers are located in frequency bands overlapped with legacy LTE frequency bands.

It has been agreed to provide 5G communication services with multicast broadcast single frequency network (MBSFN) subframes of LTE (hereinafter, interchangeably referred to as 4G communication system) in the case where the 5G downlink carriers coexist with the LTE downlink carriers as shown in scenarios 3 and 4. In the LTE standard, each network can designate MBSFN subframes among 10 subframes constituting a radio frame according to the duplexing mode (FDD or TDD).

Figure 2A:
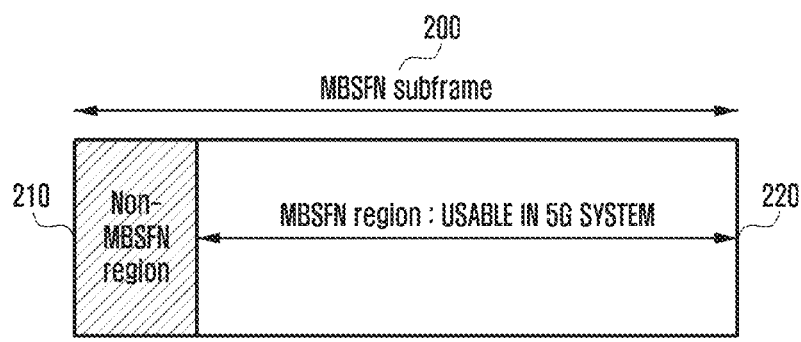
FIG. 2A is a diagram illustrating a configuration of an MBSFN subframe of LTE.

FIG. 2A is a diagram illustrating a configuration of an MBSFN subframe of LTE. The MBSFN subframe 200 includes a non-MBSFN region 210 occupying one or two orthogonal frequency division multiplexing (OFDM) symbols for transmitting physical control channels such as a physical downlink control channel (PDCCH) and a physical control format indicator channel (PCFICH). The length of the non-MB SFN region 210 is notified to an LTE terminal by means of a control format indicator (CFI) being transmitted through the PCFICH in the corresponding subframe. The remaining OFDM symbols except for the OFDM symbols allocated for the non-MBSFN region 210 is referred to as MBSFN region 220 with which the 5G communication services are provided. In this manner, the 5G communication services are provided in the frequency band having the LTE downlink carriers.

Figure 2B:
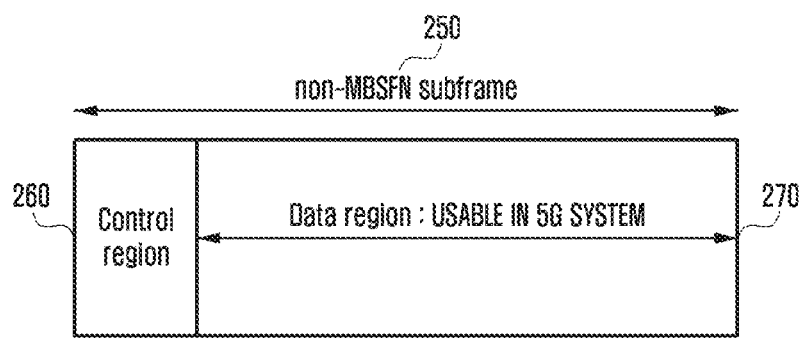
FIG. 2B is a diagram illustrating a configuration of a non-MBSFN subframe for providing a 5G communication service.

FIG. 2B is a diagram illustrating a resource in a non-MBSFN subframe for providing a 5G communication service. Unlike the MBSFN subframe, the non-MBSFN subframe 250 consists of a control region 260 carrying physical control channel and a data region 270 carrying data, which can be used for providing the 5G communication services as in FIG. 2A.

Figure 3:
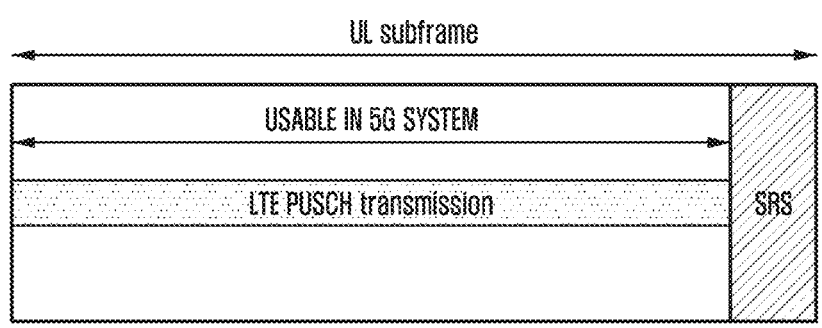
FIG. 3 is a diagram illustrating uplink subframes configured for providing 5G communication services with and without SRS.
Figure 3:
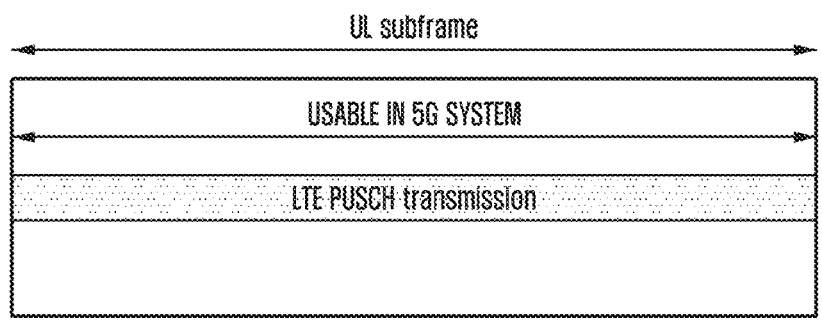

Meanwhile, a sounding reference signal (SRS), as an uplink reference signal in LTE, may be located at the last OFDM symbol of the uplink subframe. FIG. 3 is a diagram illustrating uplink subframes configured for providing 5G communication services with and without SRS. An LTE terminal cannot transmit a physical uplink shared channel (PUSCH) at the OFDM symbols to which the SRS is mapped in the subframe carrying the SRS as denoted by reference number 300 but may transmit the PUSCH even at the last OFDM symbols of the uplink subframe carrying no SRS as denoted by reference number 310. In order to accomplish this, the LTE network broadcasts the information on the subframes for SRS transmission as part of cell-specific system information in order for the LTE terminal that receives this information to be aware of the presence or absence of the SRS in a certain uplink subframe.

In the case where the 5G communication resources (particularly uplink carrier) coexist with the LTE uplink carrier as shown in scenarios 2 and 4 of FIG. 1, the 5G transmission may be performed without collision with the LTE SRS transmission by using only the remaining OFDM symbols except for the last OFDM symbol occupied for LTE SRS transmission as shown in part 300 of FIG. 3. In the case where non SRS is transmitted in the LTE uplink subframe, the 5G communication system may use all of the OFDM symbols for providing 5G communication services as shown in part 310 of FIG. 3.

Meanwhile, the LTE terminal performs downlink synchronization with a primary synchronization signal (PSS) and a secondary synchronization signal (SSS) and then a random access procedure (random access channel (RACH) process) to achieve uplink synchronization. The LTE terminal may achieve downlink timing and frequency synchronization with the corresponding network through the downlink synchronization procedure. The LTE terminal may detect a downlink subframe boundary of the corresponding LTE network through the timing synchronization.

Figure 4:
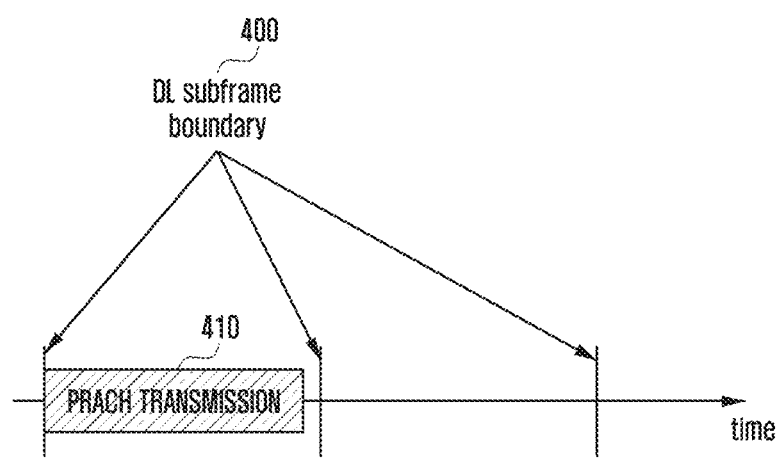
FIG. 4 is diagram illustrating a method for an LTE terminal to transmit a PRACH preamble.
Figure 5:
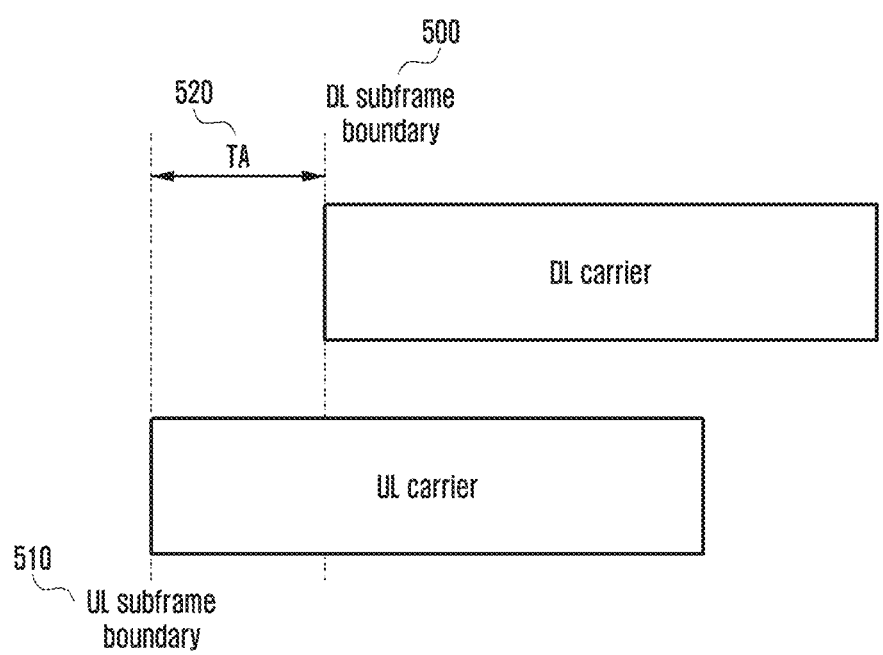
FIG. 5 is a diagram illustrating downlink and uplink subframes boundaries in view of an LTE terminal that applies a TA.

At the first step of the random access procedure, the LTE terminal transmits a physical random access channel (PRACH) preamble using the resources allowed for the PRACH preamble transmission, the information thereof being derived from the system information broadcast by the LTE network. The LTE terminal transmits the PRACH preamble based on the subframe boundary detected as the downlink synchronization result. FIG. 4 is diagram illustrating a method for an LTE terminal to transmit a PRACH preamble. The LTE terminal may start transmitting the PRACH preamble at the start boundary of the downlink subframe 400. That is, the LTE terminal may transmit the PRACH preamble without application of any offset. The travel time of the PRACH preamble from the LTE terminal to the LTE network (i.e., base station) varies depending on the location of the LTE terminal within the LTE cell, and the LTE network notifies the LTE terminal of a timing advance (TA) value for estimation of the time of arrival during the random access procedure. The terminal performs uplink transmission earlier based on the TA value. FIG. 5 is a diagram illustrating downlink and uplink subframes boundaries in view of an LTE terminal that applies a TA. In the case of applying the TA 520, the uplink subframe boundary 510 is positioned ahead of the downlink subframe boundary by the TA because the terminal performs the uplink transmission earlier by the TA.

If the 5G communication system does applies no offset to the subframe or slot boundaries in the downlink and uplink carriers like the LTE system (i.e., considers only the TA like the LTE system), this may cause a problem in that the LTE SRS is not aligned at predetermined positions on the time line of the 5G communication system under the assumption that the 5G services are provided in the scenarios a shown in FIG. 1. There is therefore a need of a method for protecting against collision between the LTE SRS and 5G communication signal transmissions.

Figure 6:
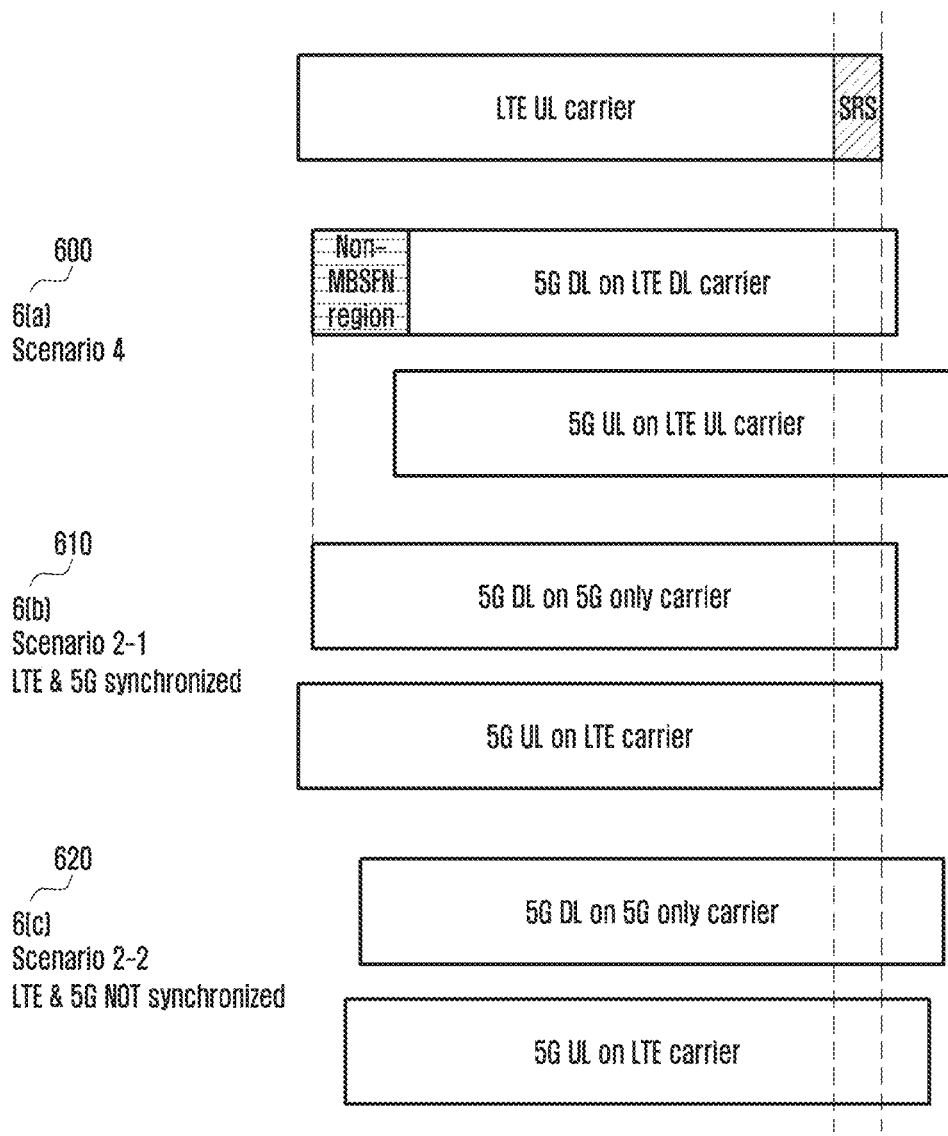
FIG. 6 is a diagram illustrating a problematic situation where an LTE SRS is not aligned at predetermined positions in the time resource of the 5G communication system.

FIG. 6 is a diagram illustrating a problematic situation where an LTE SRS is not aligned at predetermined positions in the time resource of the 5G communication system. In reference to FIG. 6, assuming the scenario 4 (5G downlink and uplink carriers are located in frequency bands overlapped with legacy LTE frequency bands) in FIG. 1, the LTE SRS position may not fall on a 5G slot boundary as denoted by reference number 600. Particularly, the SRS position may vary in view of the 5G downlink and uplink carriers according to the length of the non-MBSFN region. This is because the 5G downlink carrier subframe boundary is determined based on the MBSFN region of the LTE subframe and the 5G uplink carrier subframe boundary is determined based on the 5G downlink carrier subframe boundary and the TA. Here, the LTE MBSFN subframe consists of 12 OFDM symbols with an extended cyclic prefix (CP). Hereinafter, the term "5G communication subframe" may be interchangeably referred to as "slot."

Assuming the scenario 2 (the 5G downlink carrier is located in a frequency band separated from the legacy LTE frequency band while the 5G uplink carrier is located in a frequency band overlapped with a legacy LTE frequency band) in FIG. 1, if the LTE network and the 5G network are synchronized with each other, the LTE SRS position may fall on a 5G slot boundary as denoted by reference number 610. If the LTE network and the 5G network are not synchronized with each other, the LTE SRS position may not fall on the 5G slot boundary as denoted by reference number 620.

Figure 7:
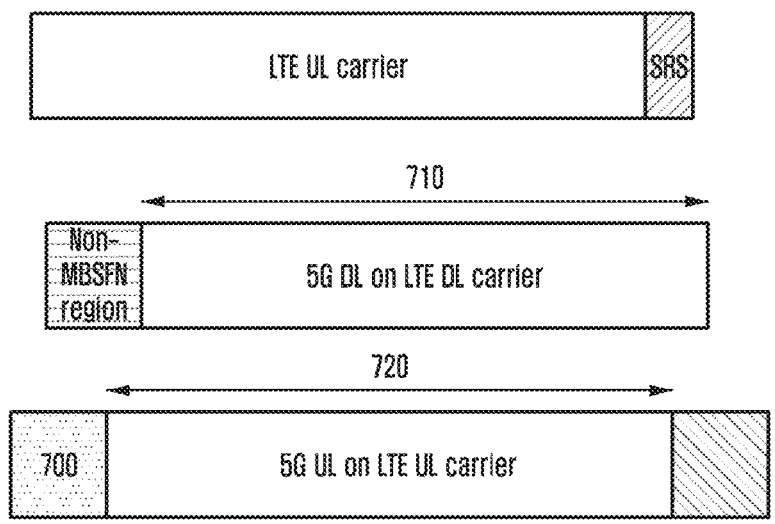
FIG. 7 is a diagram illustrating an FDD frame structure available for a case where no offset is applied to a 5G communication system.

A 5G communication system has to have a function capable of coexistence with the legacy LTE network. As described above, the LTE does not apply any offset to the subframe or slot boundary on the downlink and uplink carriers. FIG. 7 is a diagram illustrating an FDD frame structure available for a case where no offset is applied to a 5G communication system. In reference to FIG. 7, a 5G downlink transmission may be performed in the LTE MBSFN region or the LTE data region 710, and a 5G uplink transmission may be performed in consideration of the start time of the LTE MBSFN region or LTE data region. Here, if the 5G communication system and the LTE communication system are TDM'ed at the subframe level to share an LTE uplink frequency band, there is a need of a discussion about how to use the region 700. Although a shortened transmission time interval (sTTI) has been introduced in the LTE system that operates with a basic transmission unit of 1 ms, it may be preferred for the 5G communication system to use the residual region 700, because the region 700 has a length too short to use in the LTE system by using sTTI.

Figure 8:
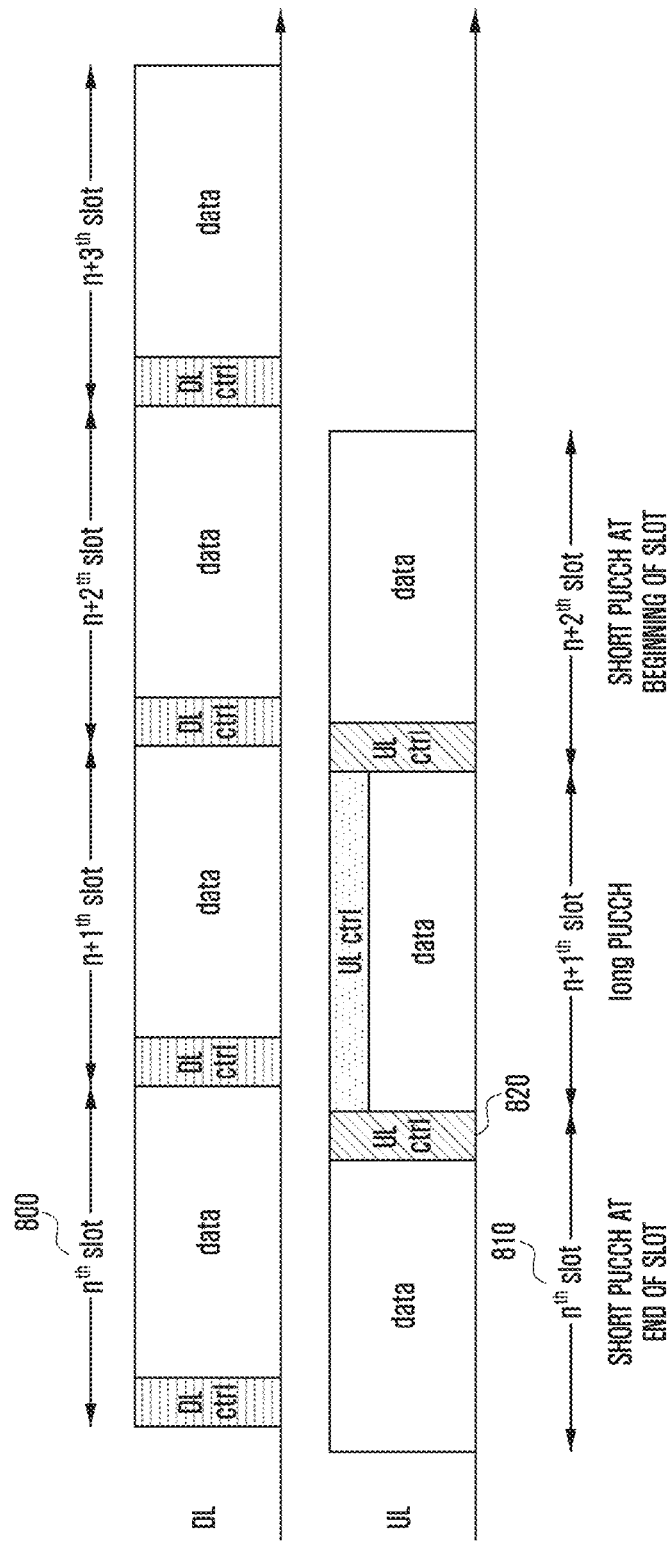
FIG. 8 is a diagram illustrating an FDD frame structure configured in consideration of a case where no offset is applied in the 5G communication system.

The 5G wireless communication system also imposes performance requirements of low latency as well as high-throughput. FIG. 8 is a diagram illustrating an FDD frame structure configured in consideration of a case where no offset is applied in the 5G communication system. With this structure, it is difficult for the terminal to perform transmission on the uplink control channel 820 at the $N^{th}$ slot 810 of the 5G uplink carrier because of the lack of hybrid automatic repeat request (HARD) acknowledgement/negative-acknowledgement (ACK/NACK) processing time, resulting in disadvantage in view of transmission delay. It may also be difficult for the terminal to perform uplink transmission in the $N^{th}$ slot based on the uplink grant received in the $N^{th}$ slot.

The present disclosure provides a method and apparatus for overcoming the above described problems.

First, a description is made of the case where there is no gap between the transmission timings on the 5G downlink and uplink carriers like the LTE system. That is, no offset is applied to the downlink and uplink subframe boundaries.

A method for avoiding collision between an LTE SRS transmission and a 5G signal transmission is first described. In this case, a problem occurs in that the LTE SRS is not aligned at predetermined positions on the timeline of the 5G communication system in the scenarios depicted in FIG. 1. It has been agreed to introduce a reserved resource configuration in the 5G communication system, which makes it possible to avoid collision between the LTE SRS and a 5G signal by transmitting a reserved resource indicator. A base station may notify a 5G terminal of the reserved resource through radio resource control (RRC) signaling.

Figure 9:
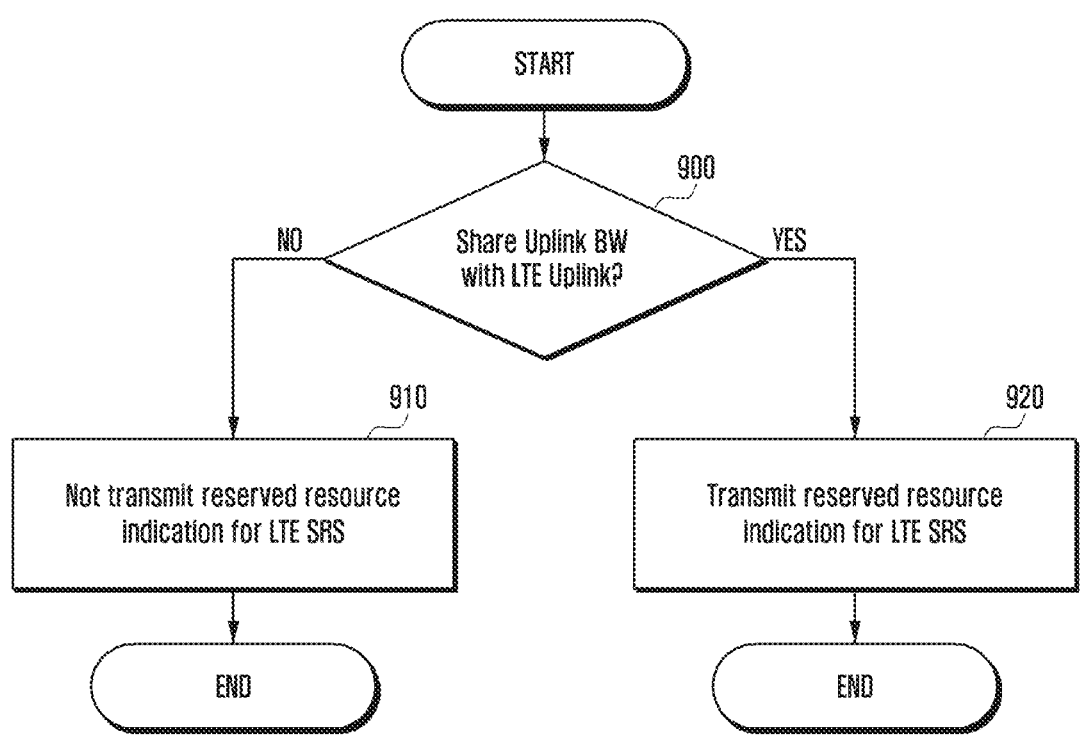
FIG. 9 is a flowchart illustrating a method for a 5G base station to transmit a reserved resource indicator to a 5G terminal.

In detail, assuming the scenarios 1 and 3 where there is an uplink frequency band only for the 5G uplink carrier in FIG. 1, it may not be necessary to use the reserved resource indicator for avoiding collision with the LTE SRS. In contrast, assuming the scenarios 2 and 4 where the 5G uplink carrier is located in the same frequency band as the LTE uplink carrier in FIG. 1 and the scenarios depicted more elaborately in FIG. 6, it may be necessary to use the reserved resource indicator. Accordingly, a 5G network node (gNB, 5G core network, 5G base station, etc.) may send the 5G terminal the reserved resource indicator selectively depending on the frequency band deployment scenario. FIG. 9 is a flowchart illustrating a method for a 5G base station to transmit a reserved resource indicator to a 5G terminal. The 5G base station determines at step 900 whether an LTE uplink carrier and a 5G uplink carrier are arranged in the same frequency band and, if so, transmits a reserved resource indicator to the 5G terminal at step 920 to avoid collision with an LTE SRS; if not so, does not transmit the reserved resource indicator to the 5G terminal at step 910.

The reserved resource indicator may be used for various purposes, and the reserved resource indicator configured for avoidance of collision with LTE SRS may be conveyed in another reserved resource indicator configured for other purposes. The reserved resource indicator configured for avoidance of collision with LTE SRS may be transmitted in a format (e.g., separate information element) separated from the reserved resource indicator configured for other purposes.

The reserved resource indicator may include information on the time-frequency resource position at which the LTE SRS is transmitted or likely to be transmitted. In order to acquire this information, the 5G network (or 5G base station or 5G network entity) and the LTE network (or LTE base station or LTE network entity) may interoperate to exchange SRS-related information. The 5G network may request to the LTE network for the SRS-related resource and receive the SRS-related information through an interface defined between the 5G network and the LTE network. In the case where the 5G network and the LTE network are not interoperating, the 5G network may overhear the system information or RRC signaling transmitted by the LTE network to acquire the LTE SRS information. The SRS-related information may be transmitted from an LTE base station to an LTE terminal through RRC signaling (SoundingRS-UL-Config).

Unlike LTE, the 5G communication system may support various numerologies on one carrier. A normal subcarrier spacing is 15 kHz in LTE, and it may be possible to use 7.5 kHz or 15 kHz for a MBSFN subframe. Meanwhile, in the 5G communication system, it is possible to use a subcarrier spacing of $15k\times2^n$Hz such as 7.5 kHz, 15 kHz, 30 kHz, 60 kHz, and 120 kHz. A 5G network node may use a numerology appropriate for the service to provide. Accordingly, the 5G network may detect the slot at which the resources reserved for collision with the LTE SRS in the 5G frame structure is configured based on the numerology in use by the corresponding 5G network and the LTE SRS-related information.

Figure 10A:
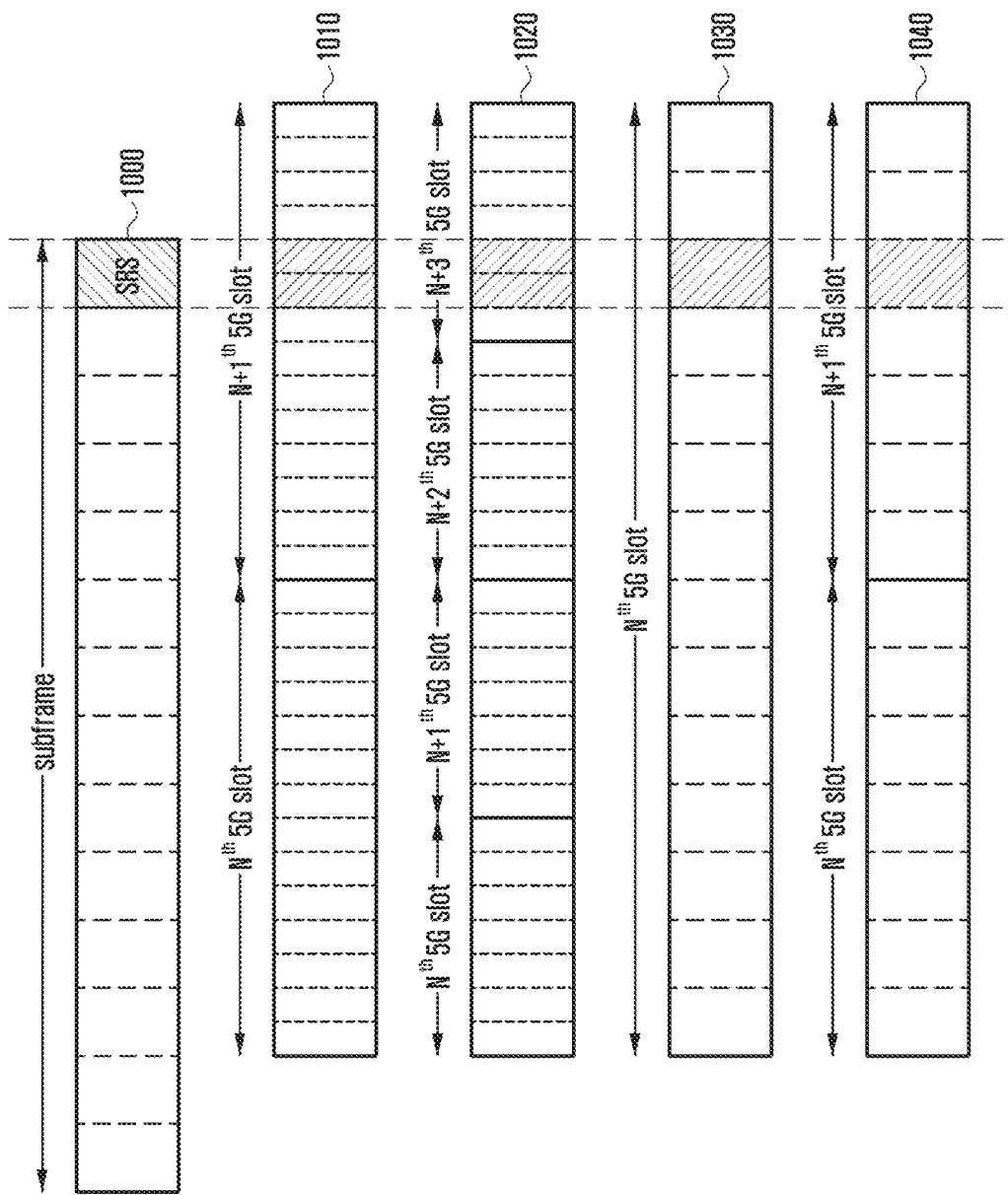
FIG. 10A is a diagram illustrating a resource prone to a collision with an LTE-SRS in accordance with a numerology of a 5G communication system.

FIG. 10A is a diagram illustrating a resource prone to a collision with an LTE-SRS in accordance with a numerology of a 5G communication system. The 5G communication system may configure a slot with 7 or 14 OFDM symbols. The length of an OFDM symbol is reversely proportional to the subcarrier spacing. In the 5G communication system, the absolute length of a slot may be changed according to the subcarrier spacing and the number of OFDM symbols constituting the slot in the time domain and so the slot number; the slot number may also be changed.

In reference to FIG. 10A, a SRS 1000 that is transmitted at the last OFDM symbol of an LTE uplink subframe collides with the ninth and tenth symbols of the $(N+1)^{th}$ slot in the 5G frame structure in which one slot consists of 14 OFDM symbols having each a symbol length of ½ the LTE OFDM symbol length as denoted by reference number 1010 and the second and third symbols of the $(N+3)^{th}$ slot in the 5G frame structure in which one slot consists of 7 OFDM symbols having each a symbol length of ½ the LTE OFDM symbol as denoted by reference number 1020. Also, the SRS 1000 mapped to the last OFDM symbol of the LTE uplink subframe collides with the twelfth symbol of the $N^{th}$ slot in the 5G frame structure in which one slot consists of 14 OFDM symbols having each a symbol length equal to the LTE OFDM symbol length as denoted by reference number 1030 and the fifth symbol of the $(N+1)^{th}$ slot in the 5G frame structure in which one slot consists of 7 OFDM symbols having each a symbol length equal to the LTE OFDM symbol length as denoted by reference number 1040. On the basis of the numerology applied as above, it may be possible to determine the slot and the position in the slot where the LTE SRS transmission and 5G signal transmission collide each other in the time domain. The 5G network may determine such information on where the collision occurs.

In order to transmit the information on the position where the LTE SRS transmission and the 5G signal transmission collide each other to a 5G terminal, the 5G network may use two methods as follows.

Figure 10B:
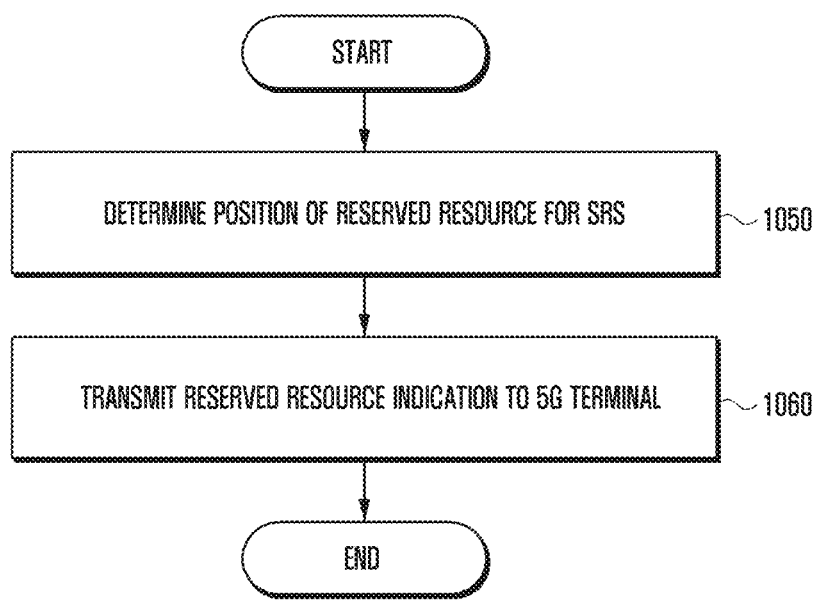
FIG. 10B is a flowchart illustrating the first method for a 5G network to notify a 5G terminal of resources on which a 5G signal and an LTE SRS are likely to collide each other.

FIG. 10B is a flowchart illustrating the first method for a 5G network to notify a 5G terminal of resources on which a 5G signal and an LTE SRS are likely to collide each other. In the first method, the 5G network may determine a position of the resource reserved for protecting against collision with the LTE SRS at step 1050 and notify the 5G terminal of a slot to be reserved for the SRS explicitly at step 1060. For example, the 5G network may signal to notify the 5G terminal of the slot numbers corresponding to the resources reserved for the SRS.

The 5G network may signal to notify individual 5G terminals of the slot numbers corresponding to the reserved resources according to the terminal-specific numerologies. The signal may include each slot numbers corresponding to respective numerologies of reserved resources. The 5G network may broadcast a pair of information on the numerology in use by the 5G network (e.g. subcarrier spacing and slot structure (number of OFDM symbols per slot)) and a slot corresponding thereto to 5G terminals. It may also be possible to broadcast a pair of a slot number and a symbol number that are determined based on the numerology applicable to the 5G communication system.

Figure 10C:
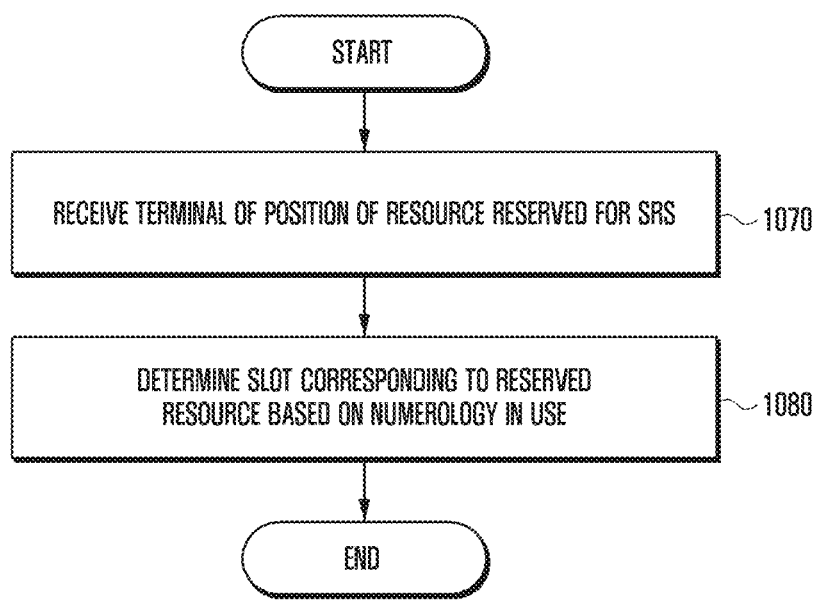
FIG. 10C is a flowchart illustrating the second method for a 5G network to notify a 5G terminal of resources on which a 5G signal and an LTE SRS are likely to collide each other.

FIG. 10C is a flowchart illustrating the second method for a 5G network to notify a 5G terminal of resources on which a 5G signal and an LTE SRS are likely to collide each other. According to the second method, the 5G network may command the 5G terminal to perform a calculation to designate a slot for SRS resource reservation. For example, the 5G network may signal, at step 1070, to notify the 5G terminal of the position of the resources reserved for SRS in the time domain, and the 5G terminal may receive the position of the resource reserve for SRS at step 1070 and may perform calculation to determine, at step 1080, the slot corresponding to the reserved resources in consideration of the numerology in use or running. For example, the position of the resource reserved for SRS in the time domain may be configured based on a reference numerology (e.g., subcarrier spacing of 15 kHz). The 5G network may notify the 5G terminal of the OFDM symbols corresponding to the reserved resources based on the reference numerology or the slot including the reserved resources based on the reference slot structure (e.g., one slot consists of 7 OFDM symbols). If the 5G network notifies the 5G terminal of at least one of the slot number or the symbol number according to the reference numerology, the 5G terminal may calculate the position of the reserved resources in the time domain according to the numerology configured for the 5G terminal. The reserved resource indicator transmitted by the 5G network may a slot number, a symbol number, or a pair of them.

As described above, the LTE MBSFN subframe has an extended CP (symbol length is 16.7 us corresponding to $512T_s$). In the case of using the extended CP, an LTE subframe consists of 12 OFDM symbols because the extended CP is longer than a normal CP (first OFDM symbols has a length of 5.1 us ($160T_s$), and the remaining symbols have each a length of 4.7 us ($144T_s$)). In the present disclosure, however, it may be possible to use the normal CP in the non-MBSFN region when the normal CP is in use for the non-MBSFN subframe and to use the extended CP in the non-MBSFN region when the extended CP is in use for the non-MBSFN subframe.

Figure 11:
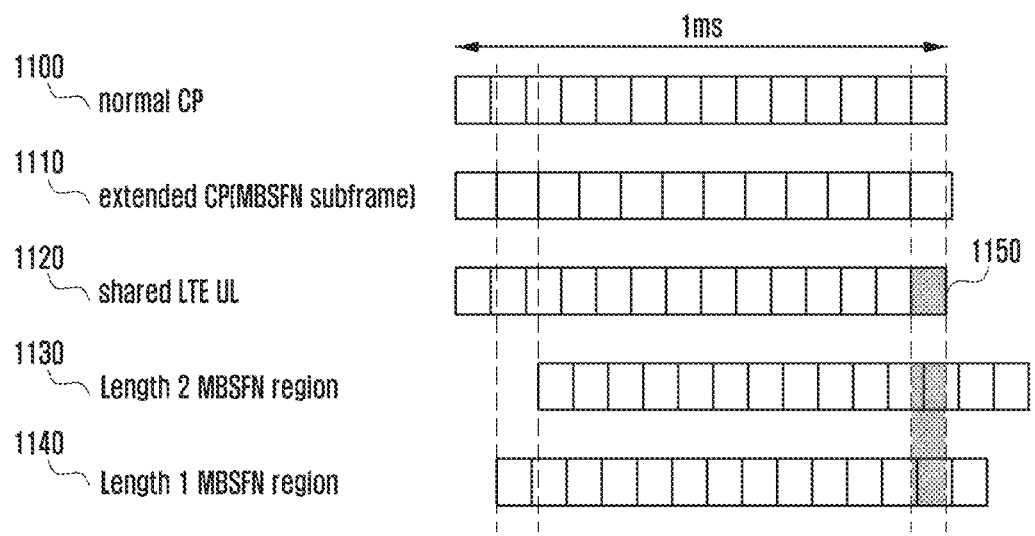
FIG. 11 is a diagram illustrating 5G a resource prone to a collision with an LTE SRS in accordance with a length of a MBSFN region.

FIG. 11 is a diagram illustrating 5G a resource prone to a collision with an LTE SRS in accordance with a length of a MBSFN region. It may be possible to use the normal CP in an uplink subframe 1120 and the extended CP in an MBSFN region of an MBSFN subframe 1110 in an LTE system. Reference number 1130 denotes 5G resources in the case where the MBSFN region occupies two OFDM symbols and the 5G communication system shares the LTE uplink frequency band, and reference number 1140 denotes 5G resources in the case where the MBSFN region occupies one OFDM symbol and the 5G communication system share the LTE uplink frequency band. In FIG. 11, reference number 1150 denotes the radio resources corresponding to the reserved resources occupying a certain number of OFDM symbols, which is determined depending on the numerology and the length of the MBSFN region in use by the 5G communication system. For example, the reserved resources may be composed of two OFDM symbols for the case of using the subcarrier spacing of 15 kHz as shown in FIG. 11 and three or four OFDM symbols for the case of using the subcarrier spacing of 30 kHz.

The time domain resources required to be configured as reserved resources for LTE SRS may vary in position within a 5G slot depending on the scenario. Accordingly, the information on the position of the reserved resource in the slot should be included in the reserved resource indicator for SRS. The 5G network has to acquire the corresponding information per scenario and include the above information in the reserved resource indicator indicating the resources reserved for the SRS. The information on the position of the reserved resource in the slot may include the number of the OFDM symbol in the corresponding slot and numbers of all OFDM symbols or the number of the first OFDM symbol in the case where multiple OFDM symbols are designated. In the case of signaling the number of the first OFDM symbol, the 5G terminal may calculate the number of OFDM symbols forming the reserved resources based on the numerology in use by the 5G terminal. It may also be possible to shift the starting position (i.e., slot boundary) of the 5G uplink slot in order to improve the spectral efficiency by reducing the reserved resource amount. The shifting size may be transmitted to the 5G terminal through the broadcast system information or RRC signaling or predefined in the standard document.

The reserved resource indicator indicating the resources reserved for the LTE SRS may be transmitted through a broadcasting signal such as a physical broadcast channel (PBCH). The reserved resource indicator may be configured in a system information block (SIB) rather than the master information block (MIB) transmitted from the 5G network to the 5G terminal through the PBCH. The 5G network may determine whether to transmit the corresponding information in the SIB depending on the scenario, and the corresponding information may be configured per terminal (user equipment (UE)) through RRC signaling.

If the 5G terminal receives the reserved resource indicator from the 5G network, it may decode the reserved resource-related information to locate the corresponding time-frequency resource position. For example, the 5G terminal may perform a puncturing operation onto the corresponding time-frequency resources. According to an embodiment, it may also be possible for the 5G terminal for which the 5G uplink data transmission is scheduled to do not use the time-frequency resources reserved for the LTE SRS within the time-frequency resources scheduled for the 5G uplink data transmission. According to an embodiment, it may also be possible for the 5G terminal allocated time-frequency resources in a semi-persistent scheduling (SPS) to do not use part of the allocated time-frequency that is overlapped with the resources reserved for the SRS. In addition to the above-described method for the 5G terminal to perform puncturing onto the corresponding resources region, it may also be possible for the 5G network to perform a normal scheduling or SPS for allocating resources with the exception of the reserved resources because the 5G network knows the reserved resource position.

Hereinafter, a description is made of the method for an LTE communication system and a 5G communication system to share an LTE uplink frequency band in a time division multiplexing (TDM) manner.

It may be considered to use a TDM or a frequency division multiplexing (FDM) scheme for implementing the method for the LTE communication system and the 5G communication system to share the LTE uplink frequency band. In the case of using a TDM scheme, a problem may arise in how to use the region 700 in FIG. 7. It may be preferred to design a 5G communication system supporting a concept of mini-slot to use the corresponding resources which cannot be used in the LTE communication system.

Figure 12:
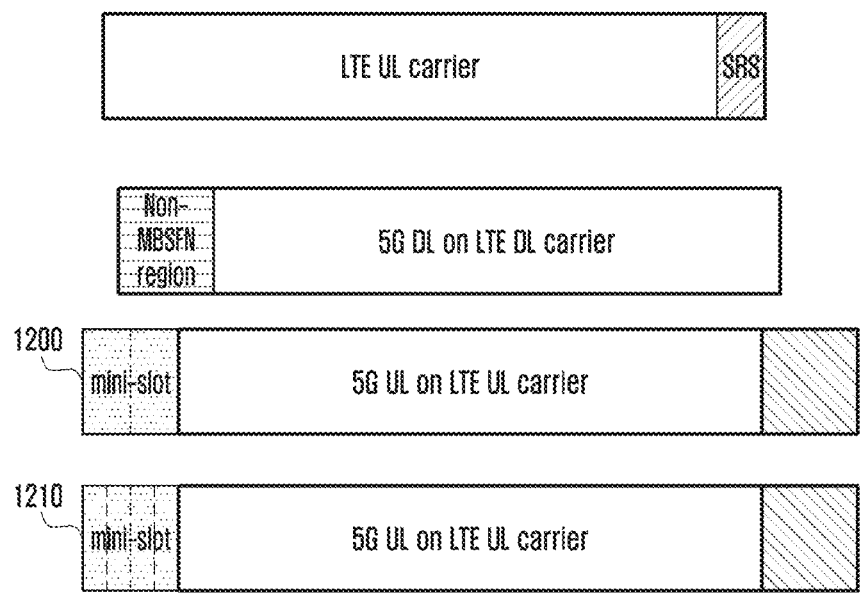
FIG. 12 is a diagram illustrating a method for using a residual region with the concept of mini-slot introduced for use in a 5G communication system according to an embodiment of the present disclosure.

FIG. 12 is a diagram illustrating a method for using a residual region with the concept of mini-slot introduced for use in a 5G communication system according to an embodiment of the present disclosure. A mini-slot consists of a number of OFDM symbols smaller than that composing a normal slot, and uplink data transmission on a physical uplink shared channel (PUSCH) in the mini-slot may be scheduled in a previous downlink slot. Reference number 1200 denotes a configuration of a mini-slot with a predetermined number OFDM symbol in the case of using the subcarrier spacing of 15 kHz, and reference number 1210 denotes a configuration of a mini-slot with a predetermined number of OFDM symbols in the case of using the subcarrier spacing of 30 kHz. The aforementioned residual region may occupy one or more mini-slots.

In this respect, there is a need of a method for configuring mini-slots for the 5G terminal. For this purpose, the 5G network may signal to notify the 5G terminal of the mini-slot information (e.g., position, size, and structure of mini-slots). The mini-slot information may be signaled to the 5G terminal through RRC signaling or broadcast signaling. The mini-slot may carry a PDCCH and, in this case, the 5G terminal that has received the aforementioned mini-slot information may perform monitoring to decode the PDCCH in the mini-slots. It may also be possible to schedule the resources of the mini-slots by means of the PDCCH in the mini-slot. The mini-slot resource scheduling information may be carried in the downlink control information (DCI) being transmitted through the PDCCH.

Figure 13:
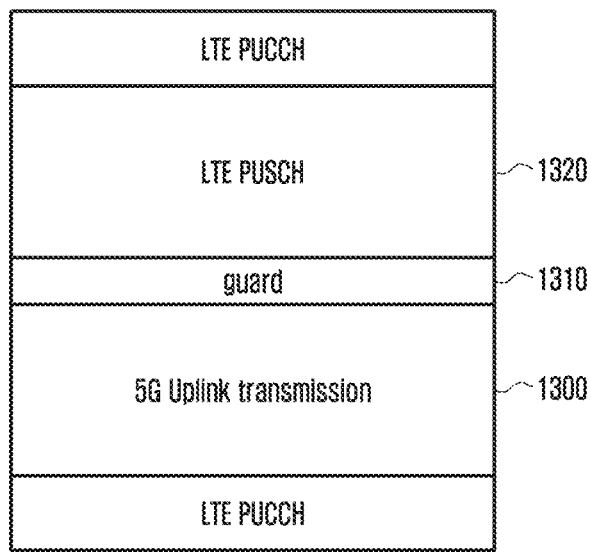
FIG. 13 is a diagram illustrating how to allocate uplink resources in consideration of a waveform.

In the case where the LTE communication system and the 5G communication system share the LTE uplink frequency band in an FDM manner, it may be necessary to introduce a guard band to overcome inter-numerology interference. For example, in the case where the 5G communication system uses a subcarrier spacing other than 15 kHz, a guard band may be used. In this case, the LTE uplink transmission may be performed with a single carrier frequency division multiple access (SC-FDMA) scheme, and the 5G uplink transmission may be performed with an orthogonal frequency division multiple access (OFDMA) or SC-FDMA scheme. FIG. 13 is a diagram illustrating how to allocate uplink resources in consideration of a waveform. The uplink band of the 5G communication system exists in the LTE uplink frequency band and, in this case, a guard band 1310 is interposed between the 5G uplink transmission resource 1300 and the LTE PUSCH resource 1320. The LTE PUSCH resource and the 5G uplink transmission resource may be switched in position per LTE subframe. The frequency bandwidths for the LTE PUSCH and 5G uplink transmissions may vary in size according to the situations (e.g., traffic amounts) of the 5G and LTE networks.

Second, a description is made of the case where a gap is introduced between the transmission timings on the 5G downlink and uplink carriers unlike the LTE system. That is, an offset is applied to the downlink and uplink subframe boundaries. As an example of the method for applying such a gap, the transmission timings on the 5G downlink and uplink carriers are determined depending on the 5G network configuration, and the information on the gap or offset is transmitted to the 5G terminal through broadcast signaling. It may be possible to use a fixed value for the gap, which is predefined in the standard document.

Figure 14A:
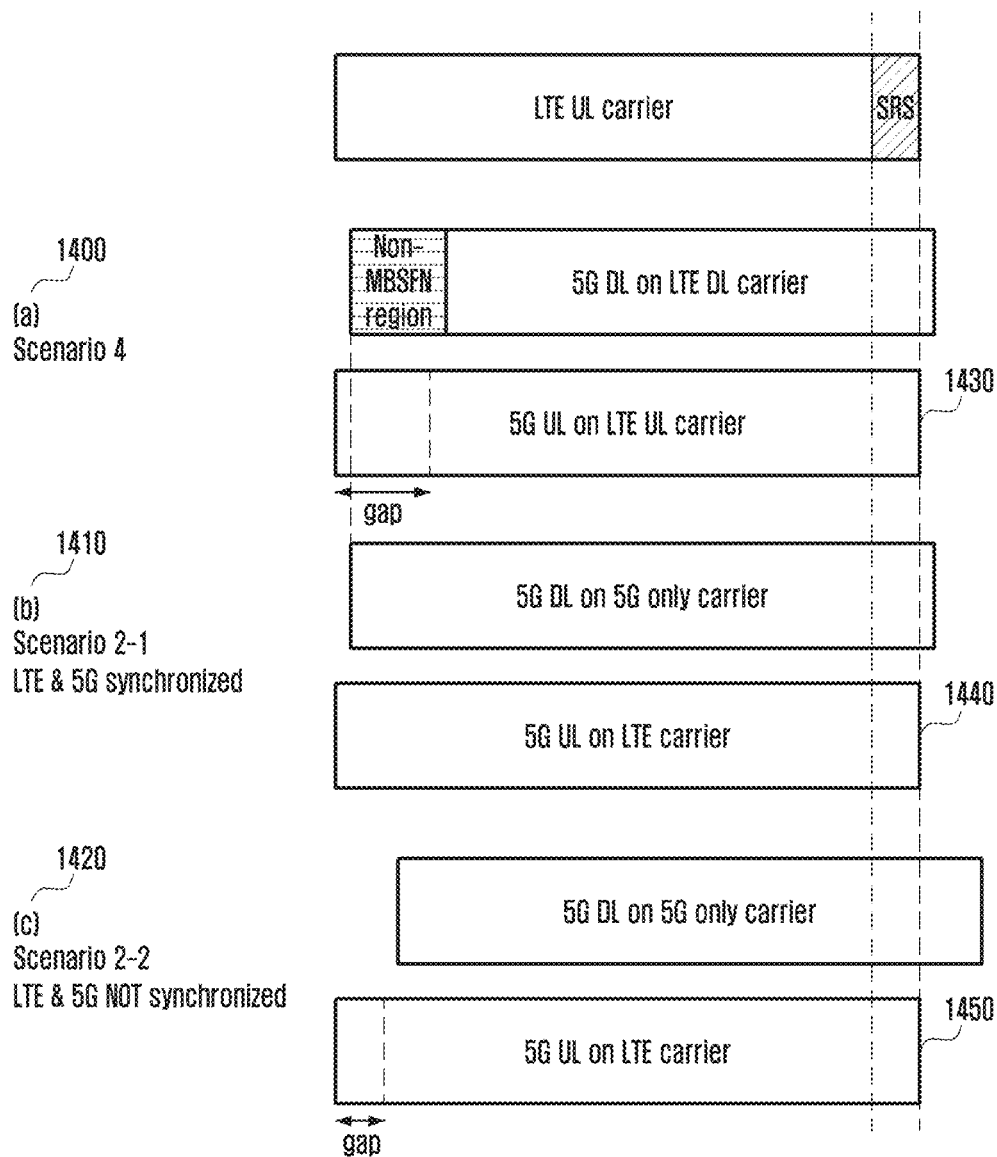
FIG. 14A is a diagram illustrating a situation where an LTE SRS and a 5G signal transmission collide each other in a case of applying a gap or offset between subframes.

A method for avoiding collision between an LTE SRS transmission and a 5G signal transmission is described for this case. In this case, the LTE SRS may exist at a predetermined position on the time line of the 5G communication system. FIG. 14A is a diagram illustrating a situation where an LTE SRS and a 5G signal transmission collide each other in a case of applying a gap or offset between subframes. Assuming the scenario 4 in FIG. 1 (part (a)) 1400, the 5G network may apply an appropriate offset such that the last symbol of the 5G uplink subframe is overlapped with the LTE SRS as denoted by reference number 1430. Assuming the scenario 2 in FIG. 1, if the LTE network and the 5G network are synchronized with each other (part (b)) 1410, the LTE SRS is overlapped with the last symbol of the 5G uplink subframe without applying any offset as denoted by reference number 1440. Assuming the scenario 2 in FIG. 1, if the LTE network and the 5G network are not synchronized (part (c)) 1420, the 5G network may apply an appropriate offset such that the LTE SRS is overlapped with the last symbol of the 5G uplink subframe as denoted by reference number 1450. As described above, the 5G network may introduce an appropriate gap to overlap the LTE SRS with a timing in the 5G uplink subframe depending on the situation.

The method for avoiding collision with the LTE SRS may be implemented as described above. In this case, however, the time domain position where the collision with the LTE SRS occurs in the 5G slot may be identically maintained regardless of the scenarios in FIG. 1, it is possible to simplify the reserved resource configuration.

Figure 14B:
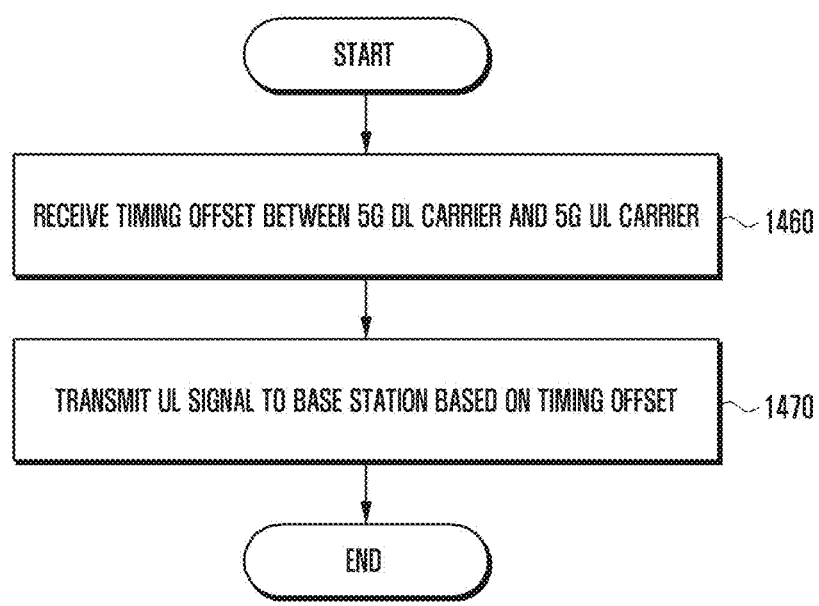
FIG. 14B is a flow chart illustrating a method for applying a gap or offset.

FIG. 14B is a flow chart illustrating a method for applying a gap or offset. The 5G terminal may receive information on the gap or offset between the 5G uplink and downlink subframes from the 5G network through system information or RRC signaling at step 1460. Upon receipt of this information, the 5G terminal may transmit an uplink signal, at step 1470, to the 5G network by applying the gap or offset information.

Hereinafter, a description is made of a method for use of resources in the case where the LTE communication system and the 5G communication system share the LTE uplink frequency band in a TDM manner. In the case of introducing a gap to protect against the occurrence of residual time-frequency resource region 700 in FIG. 7 as shown in FIG. 14A, there is no need of applying the concept of mini-slot.

By applying the gap between the uplink and downlink subframes, it is possible to reduce transmission latency. FIG.

15A is a diagram illustrating a method for reducing transmission latency by applying a gap between uplink and downlink subframes. In the 5G communication system requiring high throughput and low transmission delay, if no gap is applied between the uplink and downlink subframes as shown in FIG. 8, this may be disadvantageous in terms of transmission latency. In reference to FIG. 15, reference number 1500 denotes an uplink frame structure configured only with TA and no gap in the case of using the downlink frame structure configured as denoted by reference number 1500. In this case, it is difficult to transmit the A/N information corresponding to the downlink data 1504 transmitted at the $n^{th}$ slot 1502 in downlink using the uplink control channel 1514 of the $n^{th}$ slot 1512 in uplink because of a lack of processing time. In this case, the A/N information should be transmitted at the next slot, which results in transmission delay. However, the uplink frame structure may be configured as denoted by reference number 1520 with the introduction of a gag, which makes it possible to transmit the A/N information corresponding to the downlink data 1504 through the uplink control channel 1524 of the $n^{th}$ slot 1522 with the sufficient processing time and thus is advantageous in terms of transmission delay. Furthermore, this method is capable of reducing a delay of the uplink grant being transmitted through the PDCCH.

The gap may be set to a value calculated in consideration of a cell coverage, a round trip delay, a maximum size of a downlink control region in the time domain, and a downlink control channel processing time, and this value is signaled to the 5G terminal.

Figure 15A:
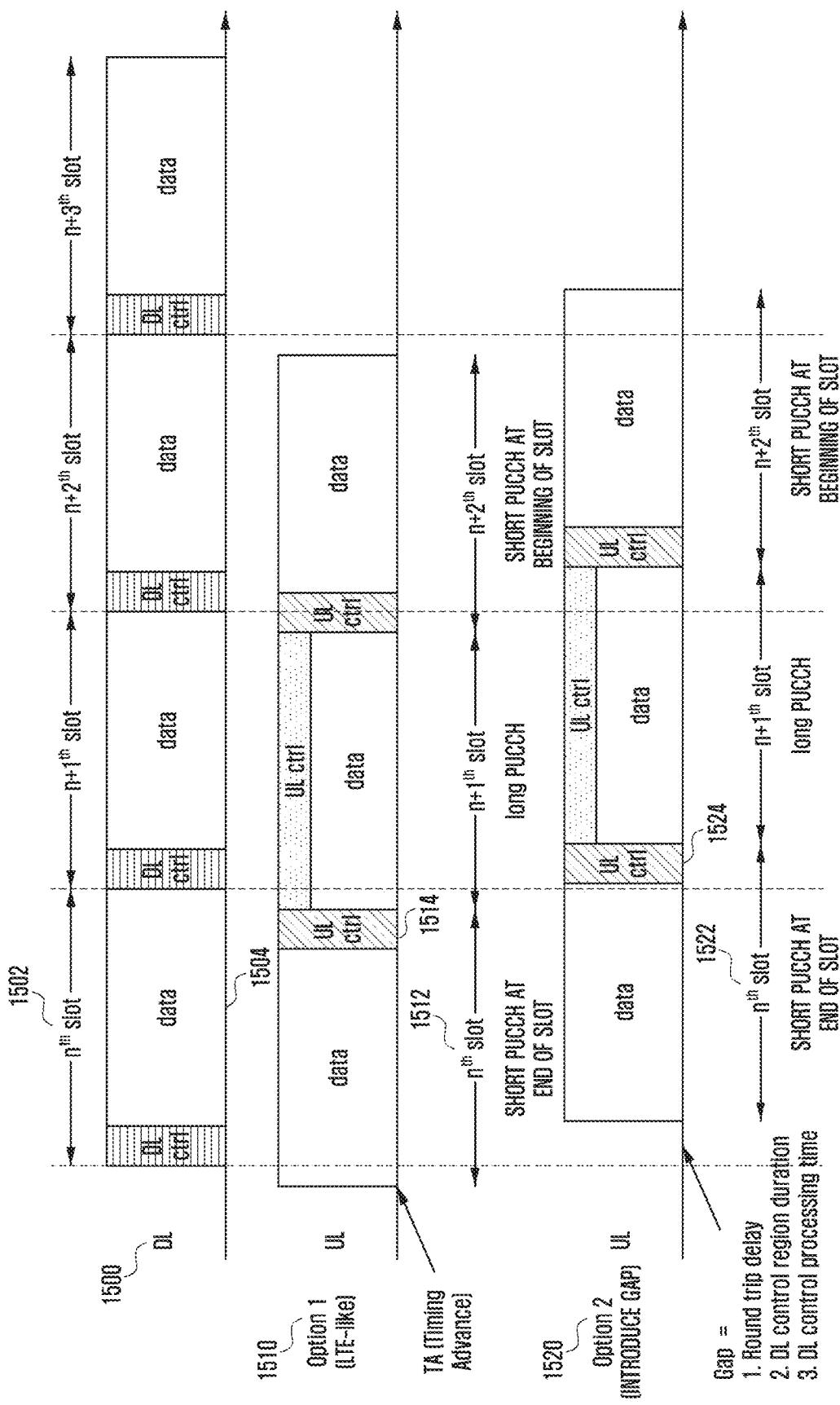
FIG. 15A is a diagram illustrating a method for reducing transmission latency by applying a gap between uplink and downlink subframes.
Figure 15B:
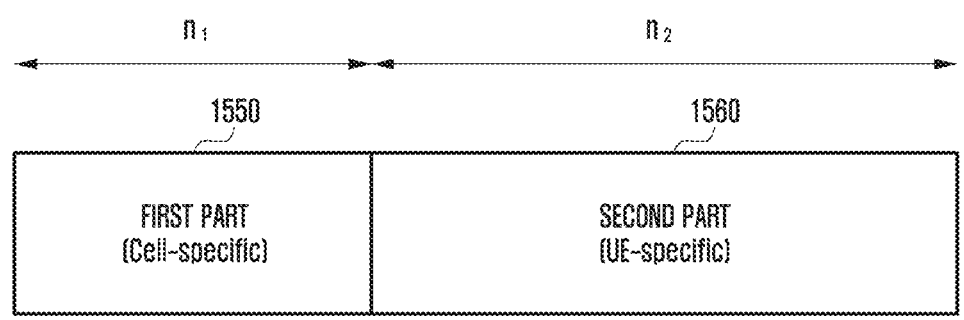
FIG. 15B is a diagram illustrating a structure of a TA command indicating a gap value.

FIG. 15B is a diagram illustrating a structure of a TA command indicating a gap value. The gap value may be included in the TA command. The TA command may be included in a random access response (RAR) or a media access control (MAC) control element (CE) being transmitted to the 5G terminal. The TA command is divided into two parts. The first part 1550 may be a bitmap with a bitwidth of $n_1$ for indicating the gap values, which are configured in a cell-specific manner. The values contained in the first part may have a loose granularity in comparison with those in the second part. For example, the values contained in the first part may have a symbol level granularity. For example, if the first part has a bitwidth of 3 bits, the 3 bits may be set to 000 to indicate no gap, 001 to indicate the gap with a length of one symbol (i.e., the slot boundary of the uplink carrier appears later by 1 OFDM symbol), 010 to indicate the gap with a length of two symbols (i.e., the slot boundary of the uplink carrier appears later by 2 OFDM symbols). The value of $n_1$ and the granularity may be defined in a $3^{rd}$ generation partnership project technical specification (3GPP TS) document by which the 5G network and the 5G terminal may abide. In the case where different subcarrier spacings are applied to the downlink and uplink carriers, the absolute time value of the first part may be determined based on the symbol length on the uplink carrier. The second part 1560 of the TA command may be a bitmap with a bitwidth of $n_2$ for indicating an offset reflecting terminal location that is also used in the 4G network (TS 36.321 6.1.3 and 6.1.5). The granularity of the second part may be greater than that of the first part (i.e., the unit for indicating the gap value in the first part may be greater than the unit for indication in the second part). Assuming that the values contained in the first part have a symbol level granularity, the values contained in the second part may have a granularity at a level smaller than one symbol. The value of $N_2$ and the granularity may be defined in the 3GPP TS document by which the 5G network and the 5G terminal may abide. In an FDD network, the TA command may include both the first and second parts. In a TDD network, the TA command may include only the second part.

Figure 16:
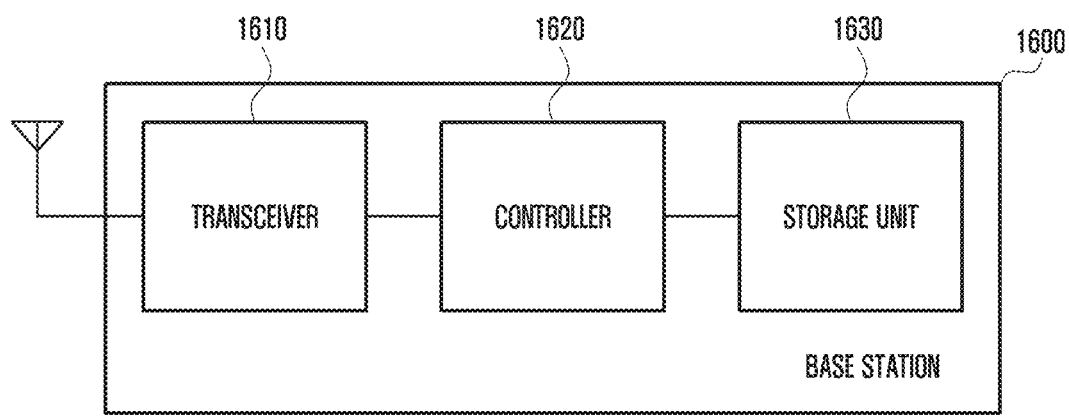
FIG. 16 is a block diagram illustrating a configuration of a base station according to an embodiment of the present disclosure.

FIG. 16 is a block diagram illustrating a configuration of a base station according to an embodiment of the present disclosure. In reference to FIG. 16, the base station 1600 may include a transceiver 1610, a controller 1620, and a storage unit 1630; the base station 1600 may be a 5G base station included in a 5G communication system and interchangeably referred to as 5G network. The transceiver 1610 may communicate signals with a 5G terminal, an LTE network, and a 5G network entity; the storage unit 1630 may store information necessary for communicating the signals with the 5G terminal, the LTE network, and the 5G network entity. The controller 1620 may control the transceiver 1610 and the storage unit 1630 to perform an operation of the present disclosure. In detail, the controller 1620 may control the transceiver 1610 to receive LTE SRS-related information from the LTE network, determine resources on which a 5G signal transmission is overlapped with an LTE SRS transmission on the time domain resources of the 5G communication system based on the LTE SRS-related information, and control the transceiver 1610 to notify a 5G terminal of the corresponding resources.

The controller 1620 may also determine a resource of a second communication system that is prone to a collision with an SRS of a first communication system occurs and controls the transceiver 1610 to transmit reserved resource information indicating the collision-prone resource and receive a signal transmitted by the terminal based on the reserve resource information, and the terminal may transmit no signal on the resources on which the collision occurs. The reserved resource information may be determined based on a numerology in use by the second communication system and SRS configuration information, and the position of the resources on which the collision occurs may be indicated by the unit of a slot or symbol in use by the second communication system.

In the case where an offset is applied between the uplink and downlink carriers of the second communication system, the controller 1620 may determine the offset and controls the transceiver 1610 to transmit the offset information to the terminal; the offset information may be determined in consideration of at least one of a downlink control information processing time, a downlink control region, and a roundtrip delay of the terminal.

In the case where no offset is applied between the uplink and downlink carriers of the second communication system, the controller 1620 may control the transceiver 1610 to transmit mini-slot configuration information for the uplink carrier and downlink data in the corresponding mini-slots and receive the SRS configuration information from the network of the first communication system.

Figure 17:
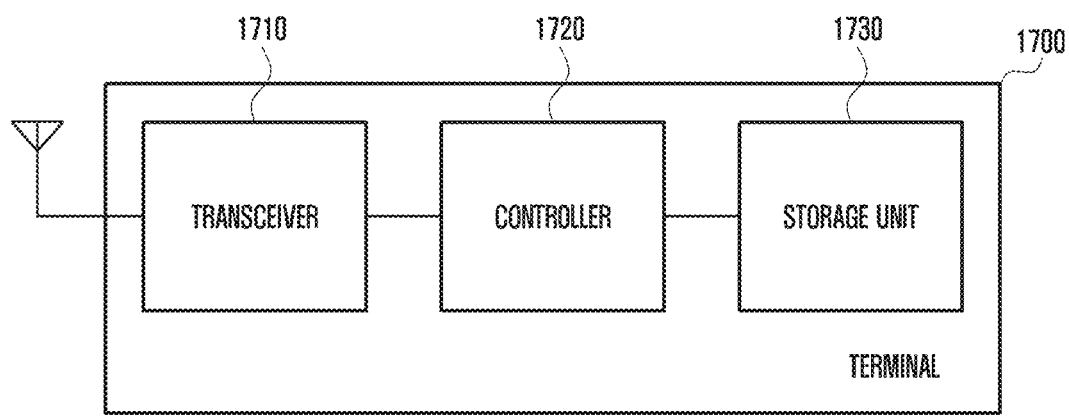
FIG. 17 is a block diagram illustrating a configuration of a terminal according to an embodiment of the present disclosure.

FIG. 17 is a block diagram illustrating a configuration of a terminal according to an embodiment of the present disclosure. In reference to FIG. 17, the terminal 1700 may include a transceiver 1710, a controller 1720, and a storage unit 1730; the terminal 1700 may be a 5G terminal included in a 5G communication system and may connect to both the LTE and 5G communication systems. The transceiver 1710 may communicate signals with a 5G network and an LTE network, and the storage unit 1730 may store information necessary for communicating the signals with the 5G network and the LTE network. The controller 1720 may control the transceiver 1710 and the storage unit 1730 to perform an operation of the present disclosure. In detail, the controller 1720 may control the transceiver 1710 to receive reserved resource-related information from the 5G network, determine resources on which a 5G signal transmission is overlapped with an LTE SRS transmission on the time domain resources of the 5G communication system based on the reserved resource-related information, control the transceiver 1710 to skip transmitting a signal on the corresponding resources.

The controller 1720 may also control the transceiver 1710 to receive reserved resource information indicating a collision-prone resource from a base station and transmit a signal to the base station based on the reserved resource information; the collision-prone resource is a resource on which a signal of a second communication system collides with an SRS of a first communication system, and no signal may be transmitted on the collision-prone resource. The reserved resource information may be determined based on a numerology in use by the second communication system and SRS configuration information, and the position of the resources on which the collision occurs may be indicated by the unit of a slot or symbol in use by the second communication system.

In the case where an offset is applied between the uplink and downlink carriers of the second communication system, the controller 1720 may control the transceiver 1710 to receive the offset information from the base station; the offset information may be determined in consideration of at least one of a downlink control information processing time, a downlink control region, and a roundtrip delay of the second communication system.

In the case where no offset is applied between the uplink and downlink carriers of the second communication system, the controller 1720 may control the transceiver 1710 to receive mini-slot configuration information configured for the uplink carrier and downlink data in the corresponding mini-slot.

As described above, the method for facilitating coexistence of a 5G communication system with a 4G communication system according to an embodiment of the present disclosure is advantageous in terms of improving a performance of the 4G communication system by guaranteeing SRS transmission of the 4G communication system while enhancing resource utilization efficiency and protecting against transmission latency in the 5G communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for transmitting and receiving a signal in a wireless communication system, the method comprising:
   determining a resource of a second communication system that is overlapped with a sounding reference signal (SRS) of a first communication system;
   generating a reserved resource information indicating the overlapped resource, based on whether an offset is applied between an uplink subframe boundary and a downlink subframe boundary;
   transmitting the reserved resource information to a terminal; and
   receiving a signal transmitted by the terminal based on the reserved resource information, wherein no signal is transmitted on the overlapped resource.

2. The method of claim 1, wherein the reserved resource information is determined based on a numerology used by the second communication system and SRS configuration information.

3. The method of claim 1, wherein: the reserved resource information comprises information about at least one of a slot or a symbol included in the overlapped resource of the second communication system.

4. The method of claim 1, further comprising:
   determining, in a case that the offset is applied between the uplink subframe boundary and the downlink subframe boundary of the second communication system, applied offset information; and transmitting the offset information to the terminal.

5. The method of claim 4, wherein the offset information is determined by considering at least one of a downlink control information processing time, a downlink control region of the second communication system, or a round trip delay of the terminal.

6. The method of claim 1, further comprising: transmitting, in a case that no offset is applied between the uplink subframe boundary and the downlink subframe boundary of the second communication system, mini-slot configuration information for an uplink carrier; and transmitting downlink data in a mini-slot as indicated by the mini-slot configuration information.

7. The method of claim 2, further comprising receiving the SRS configuration information from a network of the first communication system.

8. A method for transmitting and receiving a signal in a wireless communication system, the method comprising:
   receiving, from a base station, reserved resource information indicating an overlapped resource of a second communication system with a sounding reference signal (SRS) of a first communication system, wherein the reserved resource information is generated based on whether an offset is applied between an uplink subframe boundary and a downlink subframe boundary; and
   transmitting a signal to the base station based on the reserved resource information, wherein no signal is transmitted on the overlapped resource.

9. The method of claim 8, wherein the reserved resource information is determined based on a numerology used by the second communication system and SRS configuration information.

10. The method of claim 8, wherein: the reserved resource information comprises information about at least one of a slot or a symbol in the overlapped resource of the second communication system.

11. The method of claim 8, further comprising receiving, in a case that the offset is applied between the uplink subframe boundary and the downlink subframe boundary of the second communication system, offset information from the base station.

12. The method of claim 11, wherein the offset information is determined by considering at least one of a downlink control information processing time, a downlink control region of the second communication system, or a round trip delay of a terminal.

13. The method of claim 8, further comprising: receiving, in a case that no offset is applied between the uplink subframe boundary and the downlink subframe boundary of the second communication system, mini-slot configuration information for an uplink carrier; and receiving downlink data in a mini-slot as indicated by the mini-slot configuration information.

14. A base station for transmitting and receiving a signal in a wireless communication system, the base station comprising:
 a transceiver configured to transmit and receive the signal; and
 a controller configured to:
  determine a resource of a second communication system that is overlapped with a sounding reference signal (SRS) of a first communication system, and
  control the transceiver to:
   generate a reserved resource information indicating the overlapped resource, based on whether an offset is applied between an uplink subframe boundary and a downlink subframe boundary,
   transmit the reserved resource information to a terminal, and
   receive a signal transmitted by the terminal based on the reserved resource information, wherein no signal is transmitted on the overlapped resource.

15. The base station of claim 14, wherein the reserved resource information is determined based on a numerology used by the second communication system and SRS configuration information.

16. The base station of claim 14, wherein: the reserved resource information comprises information about at least one of a slot or a symbol included in the overlapped resource of the second communication system.

17. The base station of claim 14, wherein the controller is configured to: determine, in a case that the offset is applied between the uplink subframe boundary and the downlink subframe boundary of the second communication system, applied offset information, and control the transceiver to transmit the offset information to the terminal.

18. The base station of claim 17, wherein the offset information is determined by considering at least one of a downlink control information processing time, a downlink control region of the second communication system, or a round trip delay of the terminal.

19. The base station of claim 14, wherein the controller is configured to control the transceiver to: transmit, in a case that no offset is applied between the uplink subframe boundary and the downlink subframe boundary of the second communication system, mini-slot configuration information for an uplink carrier and transmit downlink data in a mini-slot as indicated by the mini-slot configuration information.

20. The base station of claim 15, wherein the controller is configured to control the transceiver to receive the SRS configuration information from a network of the first communication system.

21. A terminal for transmitting and receiving a signal in a wireless communication system, the terminal comprising:
 a transceiver configured to transmit and receive the signal; and
 a controller configured to control the transceiver to:
  receive, from a base station, reserved resource information indicating an overlapped resource of a second communication system with a sounding reference signal (SRS) of a first communication system, and
  transmit a signal to the base station based on the reserved resource information, wherein no signal is transmitted on the overlapped resource, and wherein the reserved resource information is generated based on whether an offset is applied between an uplink subframe boundary and a downlink subframe boundary.

22. The terminal of claim 21, wherein the reserved resource information is determined based on a numerology used by the second communication system and SRS configuration information.

23. The terminal of claim 21, wherein: the reserved resource information comprises information about at least one of a slot or a symbol in the overlapped resource of the second communication system.

24. The terminal of claim 21, wherein the controller is configured to control the transceiver to receive, in a case that the offset is applied between the uplink subframe boundary and the downlink subframe boundary of the second communication system, offset information from the base station.

25. The terminal of claim 24, wherein the offset information is determined by considering at least one of a downlink control information processing time, a downlink control region of the second communication system, or a round trip delay of the terminal.

26. The terminal of claim 21, wherein the controller is configured to control the transceiver to: receive, in a case that no offset is applied between the uplink subframe boundary and the downlink subframe boundary of the second communication system, mini-slot configuration information for an uplink carrier and receive downlink data in a mini-slot as indicated by the mini-slot configuration information.

* * * * *